United States Patent
Iacob et al.

(10) Patent No.: US 11,001,678 B2
(45) Date of Patent: May 11, 2021

(54) CONDUCTIVE COMPOSITE PRODUCED FROM COATED POWDERS

(71) Applicant: H.E.F., Andrezieux Boutheon (FR)

(72) Inventors: Constantin Iacob, St. Georges sur Fontaine (FR); Sébastien Bucher, Saint Etienne (FR); Fabrice Prost, Saint Etienne (FR)

(73) Assignee: H.E.F., Andrezieux Boutheon (FR)

( * ) Notice: Subject to any disclaimer, the term of this patent is extended or adjusted under 35 U.S.C. 154(b) by 0 days.

(21) Appl. No.: 15/741,432

(22) PCT Filed: Jul. 1, 2016

(86) PCT No.: PCT/FR2016/051671
§ 371 (c)(1),
(2) Date: Jan. 2, 2018

(87) PCT Pub. No.: WO2017/001805
PCT Pub. Date: Jan. 5, 2017

(65) Prior Publication Data
US 2018/0201739 A1    Jul. 19, 2018

(30) Foreign Application Priority Data
Jul. 1, 2015    (FR) ...................................... 1556210

(51) Int. Cl.
*C09K 5/14*    (2006.01)
*H01B 1/22*    (2006.01)
(Continued)

(52) U.S. Cl.
CPC ................. *C08J 3/128* (2013.01); *C09K 5/14* (2013.01); *H01B 1/02* (2013.01); *H01B 1/08* (2013.01);
(Continued)

(58) Field of Classification Search
CPC ..... C08K 9/08; C08K 3/08; C08K 3/22; C08J 7/06; C01B 33/18; C08L 83/04; C09K 5/14; H01B 1/22
(Continued)

(56) References Cited

U.S. PATENT DOCUMENTS 5,965,064 A    10/1999    Yamada et al.
6,132,645 A *  10/2000    Hedges .................... C08K 9/08
                                                                  252/510
(Continued)

FOREIGN PATENT DOCUMENTS

EP    1775786 A1    4/2007
EP    2455435 A1    5/2012
(Continued)

OTHER PUBLICATIONS

International Search Report for PCT Patent App. No. PCT/FR2016/051671 (dated Sep. 28, 2016) with English language translation thereof.
(Continued)

*Primary Examiner* — Khanh T Nguyen
(74) *Attorney, Agent, or Firm* — Kenealy Vaidya LLP

(57) ABSTRACT

Some embodiments are directed to the manufacture of functional composites (electrical conductors, thermal conductors, etc.) produced from coated powders.

9 Claims, 3 Drawing Sheets

(51) Int. Cl.
*C08J 3/12* (2006.01)
*H01B 1/02* (2006.01)
*H01B 1/08* (2006.01)
*H01B 1/12* (2006.01)
*H01B 1/24* (2006.01)

(52) U.S. Cl.
CPC ................ *H01B 1/12* (2013.01); *H01B 1/22* (2013.01); *H01B 1/24* (2013.01); *C08J 2323/06* (2013.01); *C08J 2327/18* (2013.01); *C08J 2371/10* (2013.01)

(58) Field of Classification Search
USPC ............................ 252/510, 513; 428/404, 327
See application file for complete search history.

(56) References Cited

U.S. PATENT DOCUMENTS

| | | | | |
|---|---|---|---|---|
| 2003/0113531 | A1* | 6/2003 | Hajmrle | C08L 83/04 428/327 |
| 2013/0277623 | A1* | 10/2013 | Redford | C08J 7/06 252/513 |
| 2016/0250612 | A1* | 9/2016 | Oldenburg | C01B 33/18 428/404 |

FOREIGN PATENT DOCUMENTS

| | | |
|---|---|---|
| EP | 3182417 A1 | 6/2017 |
| JP | H10-237184 A | 9/1998 |
| JP | 2004018755 A | 1/2004 |
| JP | 2007169461 A | 7/2007 |
| JP | 2010189600 A | 9/2010 |
| JP | 2010277997 A | 12/2010 |
| WO | WO2011/112042 A2 | 9/2011 |
| WO | WO2011/112042 A3 | 9/2011 |
| WO | WO2013/178692 A1 | 12/2013 |
| WO | 2014017658 A1 | 1/2014 |

OTHER PUBLICATIONS

Written Opinion for PCT Patent App. No. PCT/FR2016/051671 (dated Sep. 28, 2016).
Nov. 10, 2020 Notice of Reasons for Refusal issued in corresponding Japanese Patent Application No. 2017-565785.

* cited by examiner

CONDUCTIVE COMPOSITE PRODUCED FROM COATED POWDERS

CROSS REFERENCE TO RELATED APPLICATION(S)

This application is a national phase filing under 35 C.F.R. § 371 of and claims priority to PCT Patent Application No. PCT/FR2016/051671, filed on Jul. 1, 2016, which claims the priority benefit under 35 U.S.C. § 119 of French Patent Application No. 1556210, filed on Jul. 1, 2015, the contents of each of which are hereby incorporated in their entireties by reference.

BACKGROUND

Some embodiments are directed to the manufacture of functional composite materials (electrical conductors, thermal conductors, etc.) which are produced from coated powders. The composite material in question is composed of an organic phase, which may be a polymer, and of a thermally and/or electrically conductive phase. This conductive phase allows an organic material, which is usually insulating, to be endowed with the characteristic of electrical and/or thermal conductivity.

At the present time, these conductivity properties are obtained by mixing conductive fillers, especially metallic or ceramic fillers, with an organic base. Consequently, various types of fillers are used, in highly variable proportions, to produce a desired thermal and/or electrical conductivity value.

In the manufacturing processes used in the related art, the adjustment parameters for obtaining a thermally and/or electrically conductive material are as follows:
  the natures of the fillers incorporated into the organic matrix,
  their morphologies (forms),
  their particle sizes, and
  the proportion by mass of conductive fillers relative to the total weight of the mixture of conductive fillers and organic matrix.

When the desire is for high conductivity values, the proportions by mass of fillers to be incorporated into the organic matrix may be very substantial.

By way of example, in order to obtain electrical resistivities of less than 1 ohm·cm in an organic material, the proportions by mass of fillers of a conductive material such as silver may exceed 50% relative to the total weight of the mixture.

SUMMARY

The decrease in electrical resistivity in this type of material is then obtained by the formation of an interconnected network of conductive particles within the organic matrix. This therefore entails the presence, distributed uniformly, of a substantial volume fraction, necessarily high, of the conductive particles.

An advantage of some embodiments is to reduce substantially the proportion of conductive phase in the organic matrix while obtaining high conductivity characteristics. This is made possible by the use of coated powders, where a conductive material A clads a pulverulent organic material B, as shown in FIG. 1.

More particularly, some embodiments are directed to a conductive composite material including an interconnected network of conductive particles, where the conductive particles include a core of organic material clad with at least one layer of an electrical and/or thermal conductor material, wherein the entirety of the particles are interconnected within the internal structure of the shaped conductive composite material, thus forming a continuous three-dimensional network of conductive material, and in that the proportion by mass of the conductive cladding element of the conductive composite material represents between 1% and 30% by weight of the total weight of the weight of the conductive composite material.

A continuous three-dimensional network for the purposes of some embodiments is a network formed by the existence of contacts between the conductive coatings of each of the conductive particles.

Possibly or preferably, the proportion by mass of the conductive cladding element of the conductive composite material may represent between 5% and 20% by weight of the total weight of the weight of the conductive composite material.

The conductive composite material may possibly or preferably be in the form of a film or a three-dimensional product.

A three-dimensional object is understood for the present purposes to be a volume object which is not a film.

The conductive particles each include a core of organic material and at least one layer of a conductive material.

The layer or layers of conductive material may advantageously be made of metallic or ceramic or organic material.

According to a first variant, the conductive material (cladding the organic material core of the conductive particles) may include at least one metal selected from silver, gold, copper, aluminum, titanium, nickel, cobalt, and iron.

According to a second variant, the conductive material (cladding the organic material core of the conductive particles) may be a ceramic selected from metal oxides and from nitrides, carbides, silicon-based compounds, and tin-based mixed compounds such as, for example, ITO, which is a mixture of indium oxide and tin oxide.

According to a third variant, the conductive material (cladding the organic material core of the conductive particles) may be a conductive polymer-type organic material selected from the classes of polyacethylenes, polypyrroles, and polyanilines.

As far as the core of organic material is concerned, it may advantageously be selected from:
  thermoplastics such as polyethylenes (PE), polypropylenes (PP), polyetheretherketones (PEEK), polyetherketoneketone (PEKK), polyvinyl chlorides (PVC), polyvinylidene fluorides (PVDF), polytetrafluoroethylenes (PTFE), and silicones, and
  thermosets such as epoxies, polyesters, polyurethanes, and acrylics.

The core of organic material may advantageously possess a particle size of between 300 nm and 10 mm, and possibly or preferably between 5 µm and 300 µm.

To obtain the clad conductive particles, powders of organic material, with any type of morphology, particle size, and nature, are subjected to coating by cladding.

The core of organic material may advantageously be in a spherical or lamellar form or in the form of a flake, a thread, or a granule with a spongy, irregular form.

The conductive composite material according to some embodiments may advantageously exhibit an electrical resistivity of between $16·10^{-9}$ Ω·m and 100 Ω·m.

The conductive composite material according to some embodiments may advantageously exhibit a thermal conductivity of between 2 W·m$^{-1}$·K$^{-1}$ and 50 W·m$^{-1}$·K$^{-1}$, and possibly or preferably between 5 W·m$^{-1}$·K$^{-1}$ and 10 W·m$^{-1}$·K$^{-1}$.

The core of organic material may advantageously include thermally and/or electrically conductive fillers.

These thermally and/or electrically conductive fillers may be coated with a thermal and/or electrical conductor material like those defined above in the description.

These thermally and/or electrically conductive fillers may possibly or preferably be coated with a thermal and/or electrical conductor material of graphite, graphene, carbon nanotube, vegetable fiber or conductive polymer type.

Some embodiments demonstrate the advantage of the use of coated powders for producing functional composite materials (electrical and/or thermal conductivities).

The functionality of conductivity is greatly enhanced by virtue of the presence of the conductive phase at the particle surface.

Ideal microstructures are observed with the presence of an interconnected conductive network, like a kind of three-dimensional mesh.

As well as the aspect of the economic gain represented by this concept, allowing as it does the acquisition of characteristics of high conductivity for low proportions of filler, the use of such powder simplifies the use thereof by obviating the delicate and complex operations of mixing components, which lead inevitably to problems of inhomogeneity.

Furthermore, the thermal conductivities of the composite materials obtained according to some embodiments with silver-clad powders are superior to the values of the best or better present-day composite materials (1 W·m$^{-1}$·K$^{-1}$ to 3 W·m$^{-1}$·K$^{-1}$) and lie at between 2 W·m$^{-1}$·K$^{-1}$ and 50 W·m$^{-1}$·K$^{-1}$ 5 W·m$^{-1}$·K$^{-1}$, and possibly or preferably between 5 W·m$^{-1}$·K$^{-1}$ and 10 W·m$^{-1}$·K$^{-1}$.

The composite materials may be manufactured as a finished component (sintering, injection molding, etc.), or as a strip, or as a film, that are deformable by thermoforming, for example.

These powders may be used as such for producing functional coatings by powder coating. The coated composite powders may also be used in impregnating industrial textiles.

It should also be noted that materials which absorb radar waves (or RAM: "Radar Absorbent Materials") may be produced.

Some embodiments are likewise directed to a method for manufacturing a conductive composite material as defined according to some embodiments, including:
a) supplying and/or producing charged or uncharged organic particles;
b) cladding the organic particles with one or more layers of at least one electrical and/or thermal conductor material, to form conductive particles,
c) shaping the conductive particles to form a conductive film or a component whose shape will have been defined beforehand, wherein step b) of cladding the organic particles is carried out:
   either using a dry surface treatment technology, the particles being placed in suspension in a two-phase fluidized bed, or by a mechanical method of rotation or vibration;
   or by using a wet surface treatment technology involving oxidation-reduction reactions of precipitation or of polymerization at the surface of the particles, the particles being placed in suspension in a three-phase fluidized bed, or by mechanical or magnetic agitation method.

As dry chemical coating methods, mention may be made in particular of chemical or physical coating methods and also thermochemical treatments with scattering.

Cladding of the organic particles (step b) is followed by shaping of the conductive particles thus obtained (step c).

The shaping of these composite particles by various techniques, commonly used in the field of plastics technology, leads to the production of finished or semi-finished components having quite particular structures. This is because the presence of the conductive phase at the surface of the organic particles naturally allows a three-dimensional conductive network to be obtained which is interconnected after densification, as shown diagrammatically in FIG. 2.

Step c) of shaping the clad conductive particles may advantageously be carried out by techniques selected from sintering followed by rolling, prototyping, thermoforming, or thermal spraying.

BRIEF DESCRIPTION OF THE FIGURES

Further characteristics and advantages of some embodiments will emerge more clearly from the reading of the description hereinafter, which is given as an illustrative and non-limiting example, and which refers to the attached figures, in which.

In these examples, unless otherwise indicated, all or most of the percentages and parts are expressed as percentages by mass.

EXAMPLES

Example 1, Inventive

Silver cladding tests were carried out on a low-density polyethylene powder with a particle size of between 50 and 500 µm and an irregular morphology. Silver coating is conducted in an autocatalytic chemical bath (three-phase fluidized bed).

Proportions by mass of silver of 10% (example 1B) and 20% (example 1A) relative to the total weight of the mixture of polyethylene+silver are applied in the form of a uniform coating to the surface of the polyethylene (PE) particles, as demonstrated by the images presented in FIGS. 3A, 3B, 4A and 4B.

Figure 1:
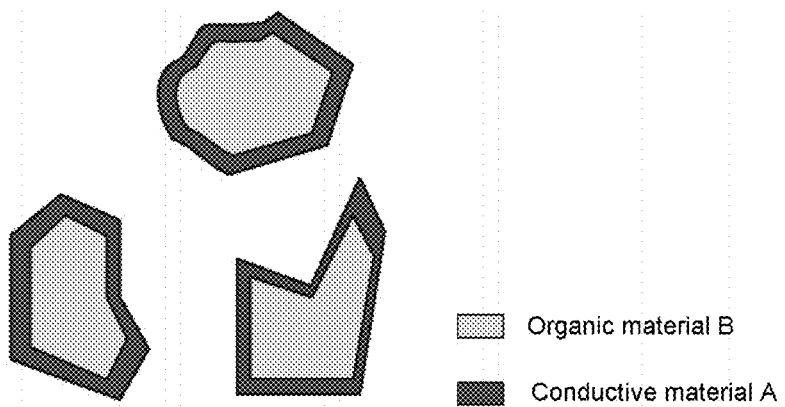
FIG. 1 shows a diagrammatic view of the conductive particles according to some embodiments.
Figure 2:
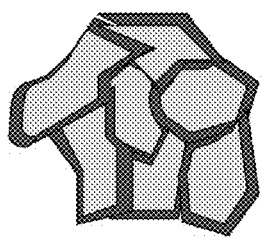
FIG. 2 shows a diagrammatic view of the structure obtained after shaping of the conductive particles.
Figure 3A:
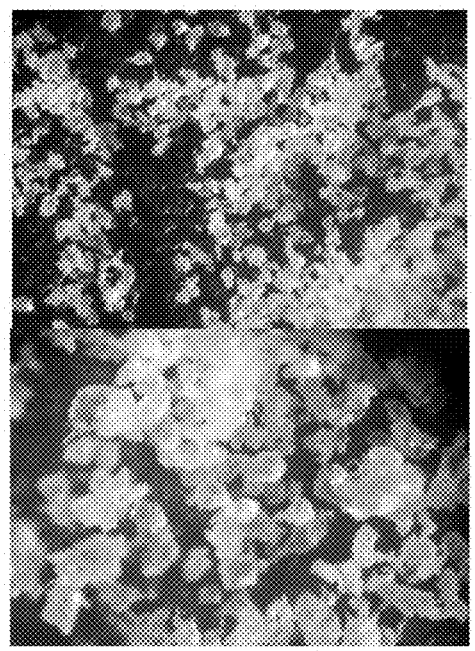
FIG. 3A shows a microscopic view of the organic polyethylene cores before cladding.
Figure 3B:
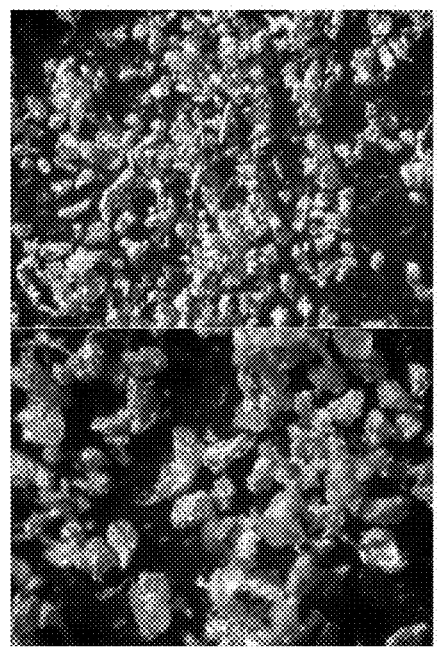
FIG. 3B shows a microscopic view of the polyethylene particles after cladding with silver by chemical coating.
Figure 4A:
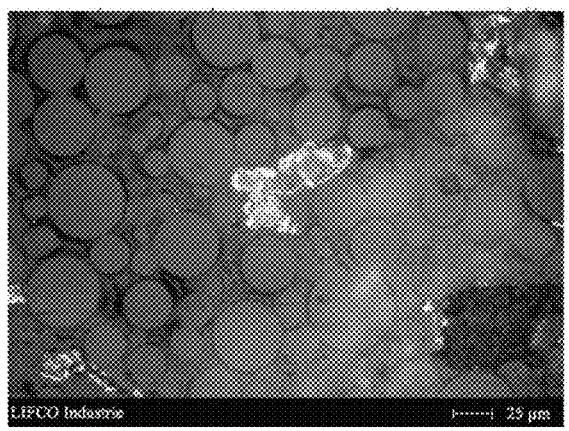
FIG. 4A shows a microscopic sectional view of the organic polyethylene cores coated with 20% by mass of silver.
Figure 4B:
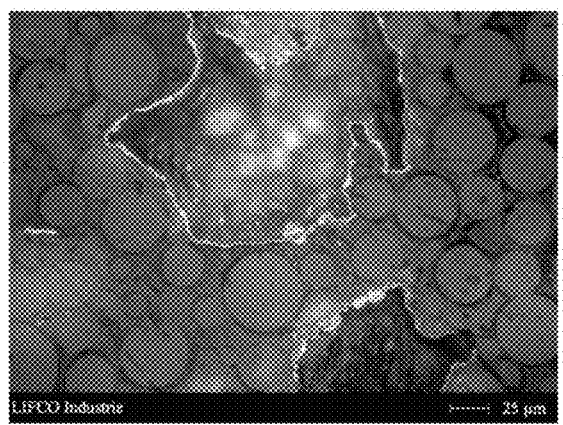
FIG. 4B show microscopic sectional view of the organic polyethylene cores coated with 20% by mass of silver.

After cross-section analysis of the particles coated with 20% by mass of silver, the presence is found of a dense and continuous silver coating of approximately 1 µm on the surface of the polyethylene particles (FIGS. 4A and 4B).

These coated powders can be used as any component according to the categories conventional in plastics technology. The shaping of these powders produces semi-finished or finished products by techniques such as extrusion, injection molding, sintering, prototyping, etc. It should be noted that the shaping technologies which give rise to high shear stresses on the material are not the most suitable for obtaining optimum conductivity performance.

Figure 7:
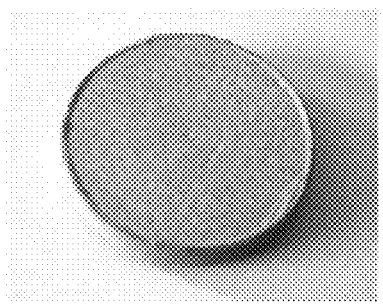
FIG. 7 illustrates a component obtained after sintering of the silver-coated polyethylene (PE) particles.

The polyethylene particles coated as indicated above are subsequently shaped by sintering (molding) under load, to give a disk with a diameter of 30 mm and a thickness of 5 mm. The shaping is carried out at a temperature of 160° C. for polyethylene. The objective of these preliminary tests is to characterize the structure of the materials, on the one hand, and their electrical resistivities, on the other (and therefore their electrical conductivities). The component obtained is shown in FIG. 7.

Figure 8:
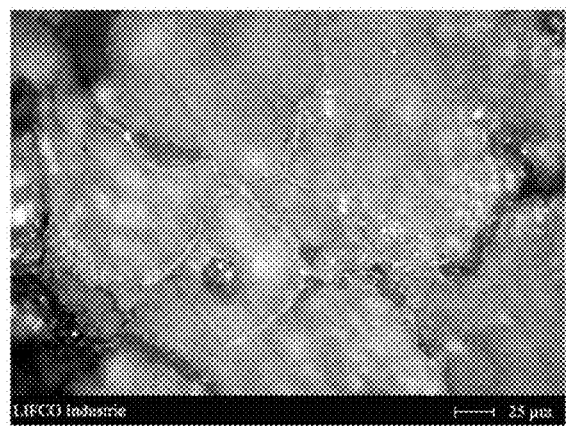
FIG. 8 illustrates the microstructure of the resulting component after sintering of the silver-coated PE particles.

The microstructure of the material is analyzed by optical microscopy after polishing of its surface. The images are shown in FIG. 8. Polishing the polyethylene-based material is made difficult because of its elasticity, which gives rise to plastic flow phenomena during the operation. A clear microstructure is therefore not easy to demonstrate. Nevertheless, the presence of the silver on the periphery of the particles can be made out, and there as well it forms a three-dimensional, interconnected network.

Example 2, Comparative

Figure 9:
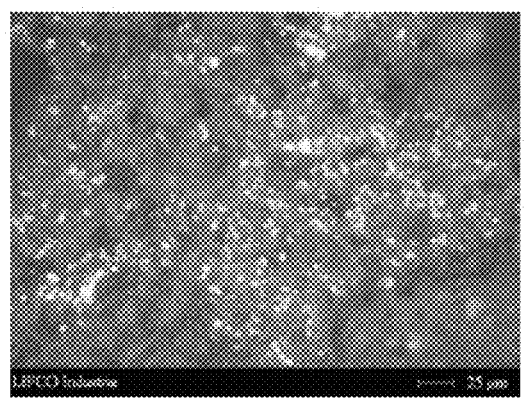
FIG. 9 illustrates the microstructure of a conductive material obtained from a mixture of polyethylene powder and silver powder.

For comparison, a conductive composite material was produced from a conventional mixture of polyethylene powder and a silver powder. The proportion by mass of silver powder was set at 70% relative to the total weight of the mixture. A mixture of this kind produces a conductive composite material having conductivity properties equivalent to the composite material produced according to some embodiments, namely including silver-coated organic particles, but with a very large proportion of silver powder. The microstructure of such a material is shown in FIG. 9. Clearly apparent is the presence of the silver in pulverulent form in substantial proportion. A volume proportion of silver of this kind allows the formation here of a sufficiently continuous network of the silver particles to produce a low resistivity within the material.

Comparison of the Properties of the Conductive Composite Materials of Inventive Example 1 and of the Comparative Example The electrical resistance was measured by a micro ohm-meter, with an inter-electrode distance of 2 cm and without contact pressure. The results obtained are recorded in table 1 below:

TABLE 1

| Material | Example | Resistance (ohms) |
|---|---|---|
| PE/Ag20% composite | Example 1A | 0.04 |
| PE/Ag10% composite | Example 1B | 0.15 |
| PE/Ag70% mixture | Example 2 comparative | 0.05 |

Table 2 below lists the electrical resistivity and thermal conductivity values of some materials by way of example:

TABLE 2

| Materials | Electrical resistivity (µohm · cm) | Thermal conductivity (W · m$^{-1}$ · K$^{-1}$) |
|---|---|---|
| Ag | 1.59 | 429 |
| Cu | 1.67 | 394 |
| Al | 2.65 | 234 |
| Fe | 9.71 | 80.4 |
| C/diamond | . | 25-470 |

Table 1 demonstrates the results of resistance measurements on various conductive materials (inventive or otherwise).

The very low resistance (or resistivity) of the materials tested is noted. It is observed that for the composites produced from coated powders, a very low proportion of silver is sufficient to ensure maximum electrical conductivity. By way of comparison, 3.5 times more silver may be required in a conventional material (example 2) produced from a powder mixture than in a composite material according to some embodiments (example 1), to obtain a resistivity of the same order. Moreover, it may also be noted that a very substantial gain in terms of the density of these composite materials is obtained, this being the direct consequence of a lower proportion of silver. For a given resistivity, the density changes from 3.1 g/cm$^3$ for the composite to 6.3 g/cm$^3$ for the mixture of powders.

Lastly, the mechanical characteristic of flexibility in polyethylene is only slightly affected for the composite material, whereas the material obtained by mixing tends to become rather stiff.

It should be noted that different support powders may also be envisaged for coating, so as to render the composite materials more or less elastic and/or more or less hard (thermoplastics, thermosets and elastomers with variable molecular masses and variable densities, as for example PEs, PPs, PEEK, PEKK, PVC, PVDF, PTFE, silicone, epoxies, polyesters, polyurethanes, etc.).

Various coatings on the particles are possible other than Ag: Cu, Nb, SnO$_2$, AlN, Ti, etc.

Some of these composites produced accordingly are very amenable to machining.

Example 3, Inventive

Silver cladding tests were carried out on a PTFE powder having a particle size of between 10 µm and 100 µm and an irregular morphology. The application of silver is carried out in an autocatalytic chemical bath (three-phase fluidized bed).

Figure 5A:
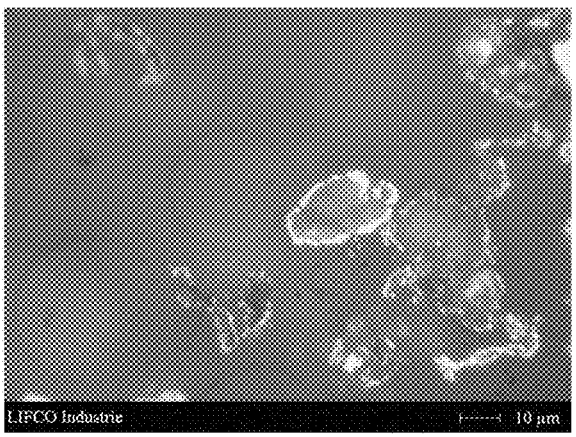
FIGS. 5A and 5B show microscopic sectional views of the organic PTFE cores coated with 40% by mass of silver.
Figure 5B:
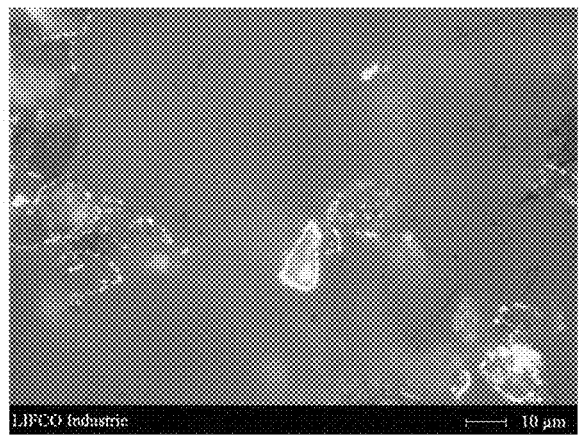

A proportion by mass of silver of 40% relative to the total weight of the mixture of PTFE+silver is applied in the form of a coating, with a thickness of approximately 1 µm, which is dense and continuous on the surface of the PTFE particles, as demonstrated by the cross-section analyses shown in FIGS. 5A and 5B.

The shaping of these coated particles by techniques such as sintering, as described above, allows the material to be endowed not only with the electrical conductivity associated with the silver, but also with the self-lubricating and non-stick character inherent to PTFE.

Example 4, Inventive

Tin oxide cladding tests were carried out on a PEKK (polyetherketoneketone) powder having a particle size of between 50 μm and 300 μm and a spongy morphology. The application of tin oxide is obtained by wet precipitation (three-phase fluidized bed).

Figure 6A:
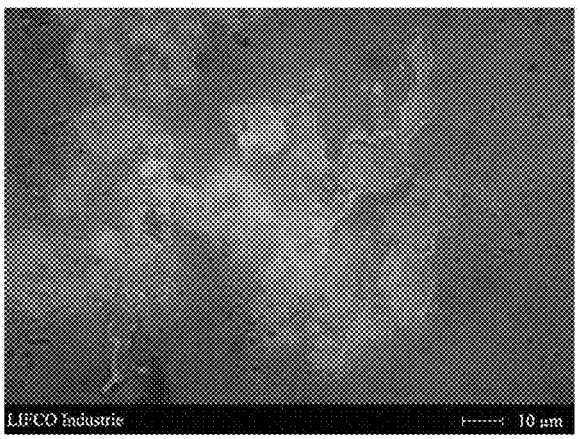
FIGS. 6A and 6B show microscopic sectional views of the organic PEKK cores coated with 30% by mass of tin oxide.
Figure 6B:

A proportion by mass of tin oxide of 30% relative to the total weight of the mixture of PEKK+tin oxide is applied in the form of a coating, with a thickness of between 1 and 2 μm, which is uniform on the surface of the PEKK particles, as demonstrated by the cross-section analyses shown in FIGS. 6A and 6B.

The shaping of these coated particles by techniques such as sintering, as described above, allows the material to be endowed with an antistatic character, associated with the presence of a tin oxide, and allows a very high maximum permissible service temperature (~250° C. continuously) to be achieved, which is one of the inherent characteristics of PEKK.

The invention claimed is:

1. A sintered dense conductive composite material only constituting of conductive particles, the conductive particles including a core of organic material clad with at least one layer of an electrical and/or thermal conductor material,
   wherein the entirety of the particles being sintered in order to be within an internal structure of the conductive composite material and in order to form an a continuous three-dimensional network of conductive material,
   the core of organic material possesses a particle size of between 50 μm and 300 μm,
   the core of organic material is a thermoplastics selected from polyethylenes (PE), polypropylenes (PP), polyetheretherketones (PEEK), polyetherketoneketone (PEKK), polyvinyl chlorides (PVC), polyvinylidene fluorides (PVDF), polytetrafluoroethylenes (PTFE), and silicones,
   the layer of conductive material is made of metallic or ceramic material, and
   wherein a proportion by mass of the layer of an electrical and/or thermal conductor material of the conductive composite material represents between 5% and 20% by weight of the total weight of the conductive composite material.

2. The conductive composite material as claimed in claim 1, wherein the conductive composite material is in the form of a film or a three-dimensional object.

3. The conductive composite material as claimed in claim 1, exhibiting an electrical resistivity of between $16.10^{-9}$ $\Omega.m$ and 100 $\Omega.m$.

4. The conductive composite material as claimed in claim 1, exhibiting a thermal conductivity of between 2 $W.m^{-1}.K^{-1}$ and 50 $W.m^{-1}.K^{-1}$.

5. The conductive composite material as claimed in claim 4, exhibiting a thermal conductivity of between 5 $W.m^{-1}.K^{-1}$ and 10 $W.m^{-1}.K^{-1}$.

6. The conductive composite material as claimed in claim 1, wherein the core of organic material includes thermally and/or electrically conductive fillers.

7. The conductive composite material as claimed in claim 6, wherein the conductive fillers are coated with an electrical and/or thermal conductor material of graphite, graphene, carbon nanotube, vegetable fiber or conductive polymer type.

8. A method for manufacturing the conductive composite material as claimed in claim 1, the method comprising:
   a) supplying and/or producing charged or uncharged organic particles, the organic particles having a particle size of between 50 μm and 300 μm and being a thermoplastics particles selected from polyethylenes (PE), polypropylenes (PP), polyetheretherketones (PEEK), polyetherketoneketone (PEKK), polyvinyl chlorides (PVC), polyvinylidene fluorides (PVDF), polytetrafluoroethylenes (PTFE), and silicones;
   b) cladding the organic particles with one or more layers of at least one electrical and/or thermal conductor material, to form conductive particles, said one or more layers is made of metallic or ceramic material,
   c) shaping the conductive particles to form a dense conductive film or a dense component whose shape will have been defined beforehand, the step of shaping the conductive particles is carried out by techniques selected from sintering,
   wherein step b) of cladding the organic particles is carried out:
      either using a dry surface treatment technology, the particles being placed in suspension in a two-phase fluidized bed, or by mechanical means of rotation or vibration; or
      by using a wet surface treatment technology involving oxidation-reduction reactions of precipitation or of polymerization at the surface of the particles, the particles being placed in suspension in a three-phase fluidized bed, or by mechanical or magnetic agitation means.

9. The method for manufacturing as claimed in claim 8, wherein the sintering of step c) of shaping the conductive particles is followed by rolling, prototyping, thermoforming, or thermal spraying.

* * * * *